March 14, 1933. C. DE V. LE SUEUR 1,901,755
MEANS FOR USE IN NAVIGATING AND LIKE OPERATIONS
Filed Dec. 9, 1930 3 Sheets-Sheet 1

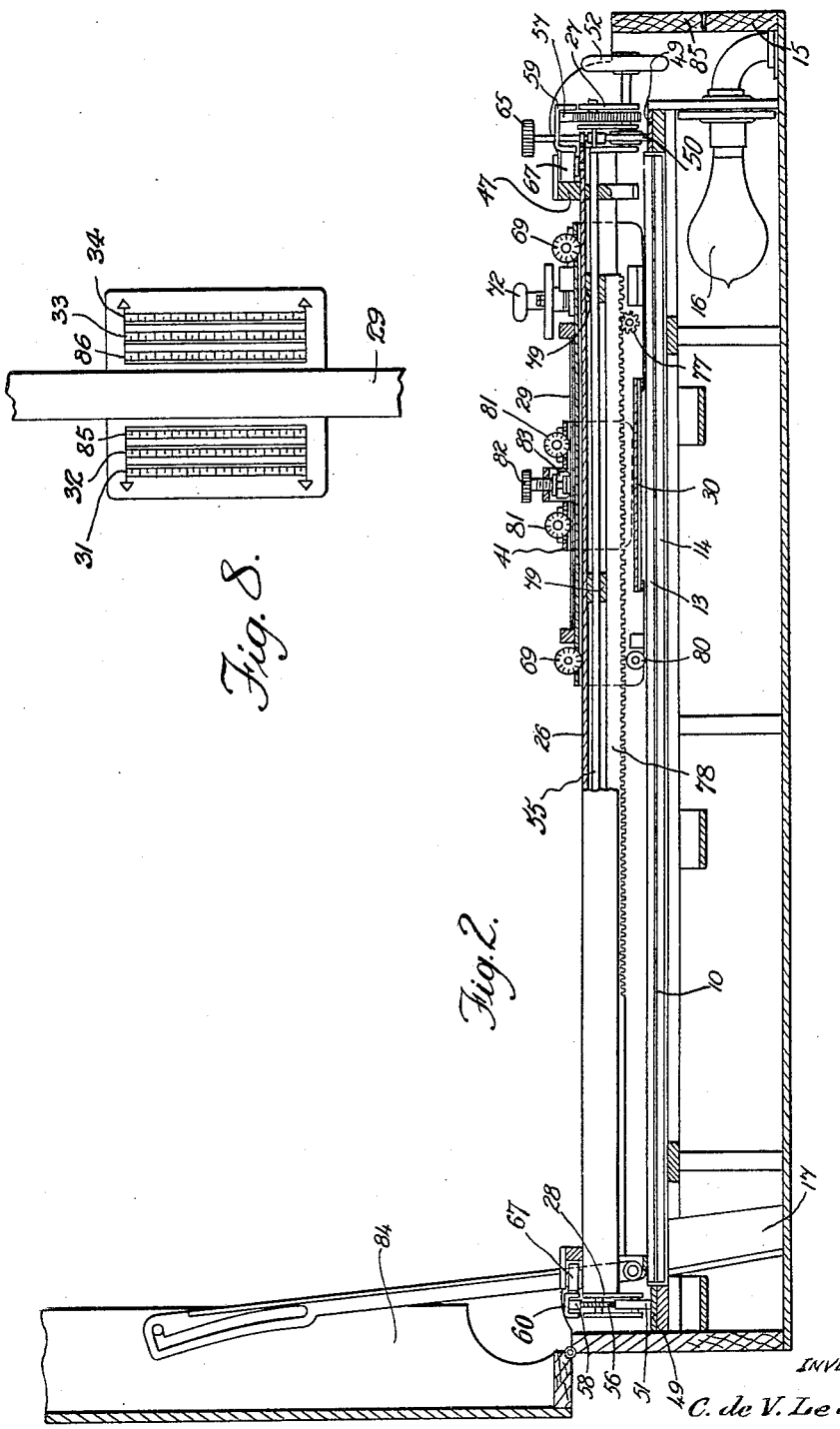

March 14, 1933. C. DE V. LE SUEUR 1,901,755
MEANS FOR USE IN NAVIGATING AND LIKE OPERATIONS
Filed Dec. 9, 1930 3 Sheets-Sheet 3
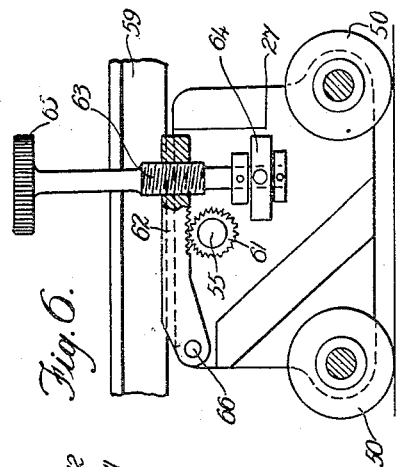
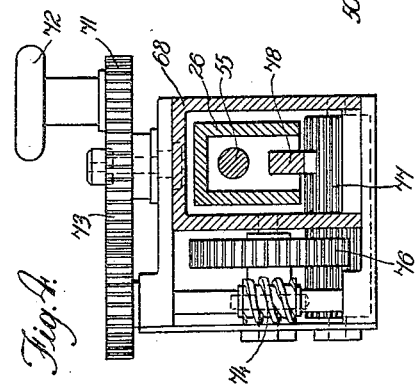
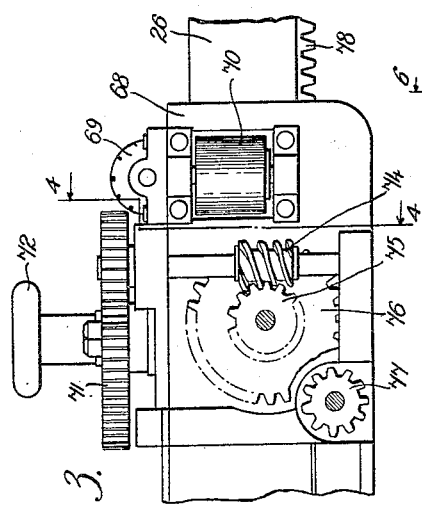
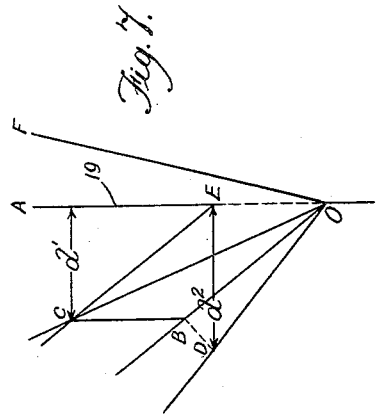
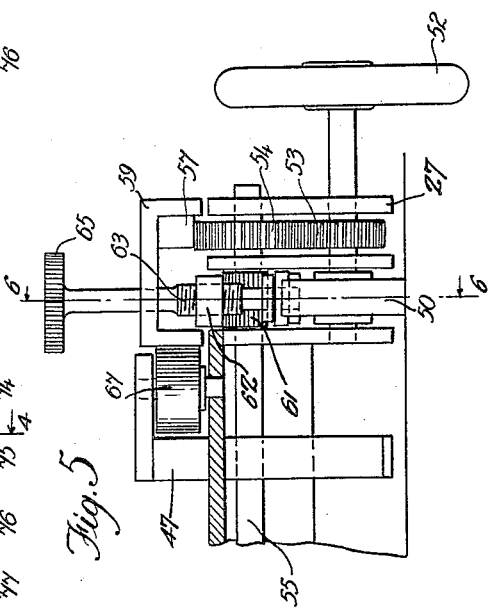
INVENTOR
C. de V. Le Sueur.
By Lacey & Lacey
Attys Patented Mar. 14, 1933

1,901,755

UNITED STATES PATENT OFFICE

CLAUDE DE VINCHELEZ LE SUEUR, OF RICHMOND, ENGLAND

MEANS FOR USE IN NAVIGATING AND LIKE OPERATIONS

Application filed December 9, 1930, Serial No. 501,158, and in Great Britain January 8, 1930.

This invention relates to improved means for use in navigating and like operations.

The object of this invention is to provide an improved graphical method of obtaining information required for the navigation of ships, aeroplanes and other travelling means. By its use the position of the observer relative to, and his distance from, a known object, as well as the course which should be steered if it is required to pass said object at a given distance, may be determined with ease. The invention may also be used for ascertaining the particulars of currents in marine and air navigation, the speed of the travelling means and the necessary corrections to be made in order that the desired course may be followed.

A means for use in navigating and like operations according to the invention comprises a chart or equivalent provided with lines radiating from or directed towards a point, and a plurality of indexes arranged for movement together upon said chart or equivalent, and provided with means for adjusting their relative positions.

Preferably the chart is plane and comprises a rectangular plotting table, the major axis of which represents the "fore and aft" line of the ship or equivalent being navigated.

The indexes may be carried by a member adapted for movement along a rail or traverse bar disposed parallel with one of the axes of the chart, whilst said rail or traverse bar may be adapted to be moved transversely of the chart upon further runners or rails disposed along the "fore" and "aft" ends of the chart.

If desired, one of the indexes may be formed upon or carried by a rectangular plate movable longitudinally of the rail or traverse bar, another of said indexes being movable in relation to the one and being carried by a subsidiary member slidably mounted in relation to the plate.

Further, locking means may be provided in connection with the movable portions of the device, and preferably multiple and/or fractional scales are provided for use in short and long distance determinations, respectively.

One form of instrument according to the invention is illustrated in the accompanying diagrammatic drawings, in which:—

Figure 2 is a section on the line 2—2 of Figure 1;

Figure 3 is a side elevation of the index carriage operating mechanism on a larger scale;

Figure 4 is a section on the line 4—4 of Figure 3;

Figure 5 is a detail enlarged section of one of the traverse carriages on the line 2—2 of Figure 1;

Figure 6 is a section on the line 6—6 of Figure 5;

Figure 7 is a geometric diagram illustrating some of the operations for which the device is suitable;

Figure 8 is a detail plan of a modified form of index carriage, the index frame being removed.

Figure 1:
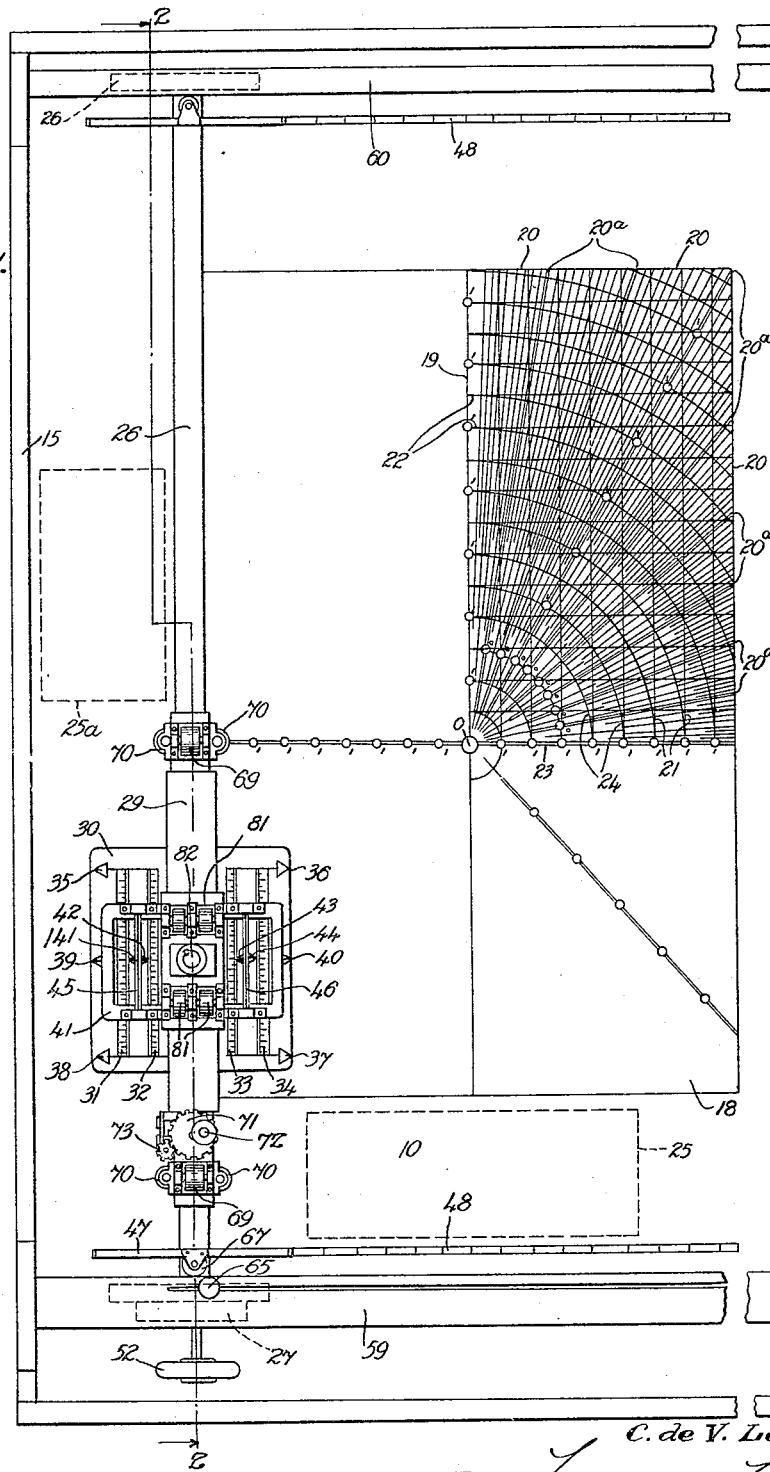
Figure 1 shows the device in plan, the cover being removed.

In the device shown generally in Figures 1 and 2, the plotting table 10 comprises a film of translucent material mounted between two sheets of glass 13 and 14 in the upper part of an outer case or cabinet 15, so as to be clearly visible both by exterior illumination and by means of transmitted light from a pair of electric bulbs 16 secured removably at one end of the casing 15, below the plotting table 10, and adapted in conjunction with the white reflectors 17 to illuminate the plotting table in a uniform manner.

The plotting table proper consists of a rectangular chart 18, the major axis 19 of which represents the "fore and aft" line of the ship or equivalent being navigated, whilst a point O situated on the "fore and aft" line 19 represents the actual position of the ship or equivalent. A number of radial lines 20 are directed towards the point O and serve as a protractor for plotting bearing angles, while extending parallel with and at right-angles to the line 19 are two series of lines 21 and 22, respectively, spaced evenly and arranged to indicate the distance of any point, firstly from the line 19 and secondly from a line 23 passing through the point O and extending at right-angles to the line 19. In order that distances from the point O may readily be plotted or read off, a number of concentric circles or arcs 24 are marked on the plotting table 18, the distance between consecutive circles or arcs 24 representing one mile. In Figure 1 these are shown only on one portion of the chart 18, but it will readily be understood that the whole of the chart 18 is similarly marked. It will be observed that these units and scales are given as examples only and may be adapted to suit requirements.

The lines 20, 21 and 22 are marked in distinctive colours so as to be readily discernable in bad light, those radial lines 20 disposed to the starboard side being preferably green in colour and those on the port, red; also the chief radial lines, i. e., those representing each 10° may be double as shown at 20ª.

Separate tables, indicated at 25 and 25ª, may be provided in the margins of the plotting table 10 to furnish information and memoranda for use in deducing distances and times.

The mechanism for obtaining and plotting points and distances upon the chart 18 comprises a traverse bar 26 of channel section extending in a direction parallel with the line 19, and mounted at each of its ends upon a traverse carriage, indicated at 27 and 28, so as to be capable of movement transversely from side to side of the chart 18, in such manner that its direction remains constantly parallel with the "fore and aft" line 19.

Mounted upon the traverse bar 26 and adapted to move from end to end thereof is an index carriage indicated at 29, secured to the underside of which is a substantially rectangular plate 30 disposed normally upon or just above the surface of the plotting table 10, in order that readings and measurements may be transferred from the chart 18 to the plate 30.

Formed upon the plate 30 are four linear scales 31, 32, 33 and 34, each extending parallel with the traverse bar 26, and calibrated to read from either end. Four indexes 35, 36, 37 and 38 are formed upon the edges of the plate 30 in line with the ends of the linear scales 31, 32, 33, 34, and are adapted to indicate in conjunction with the markings of the chart 18, while two intermediate indexes 39 and 40, also adapted to co-operate with the chart 18, are mounted upon an index frame 41 slidably mounted upon the upper portion of the index carriage 29, so that the indexes 39 and 40 may be adjusted relatively to the indexes 35, 38 and 36, 37, respectively, the distances between the indexes being denoted upon the scales 31, 32, 33, 34, by means of the pointers 141, 42, 43, 44, respectively.

In the arrangement shown, the scales 31 and 34 are inscribed with miles and fractions corresponding with those marked upon the chart 18, so that said scales 31, 34 may be used directly in combination with the chart 18. The scales 32, 33 are inscribed with miles to half the scale of the chart 18 so that, for use in determining or operating with distances greater than those accommodated by the chart 18, the scales 32, 33 may be used, the distances indicated by the chart 18 being doubled.

In order to avoid confusion, hinged flaps 45, 46, shown in their upright positions in Figure 1, may be used to cover those linear scales 31, 32, 33 and 34, and the corresponding pointers 141, 42, 43, 44, which are out of use.

Adjacent to each end of the traverse bar 26 is a traverse index 47 extending at either side of the traverse bar 26, so that its ends are in line with the index-bearing edges of the plate 30. The traverse indexes co-operate with auxiliary transverse scales 48 so as to indicate the distance of the indexes 35, 39, 38 or 36, 40, 37 from the "fore and aft" line 19.

In the operation of the device it will be understood that one side only of the plate 30 is in use at one time, the indexes 36, 40 and 37 being used when measurements are taken on the port side of the "fore and aft" line, and indexes 35, 39 and 38 being used for the starboard side. Further, when angular measurements are taken in a forward direction indexes 35 and 39 or 36 and 40 are used, while for backward bearings the indexes 38 and 39 or 37 and 40 are utilized.

In order that the movements of the various parts may be fully understood, a few of the applications of an instrument according to the invention as described are given as examples and are illustrated diagrammatically in Figure 7.

Suppose a distant light is sighted to the port side of the ship's course, and it is desired, firstly, to determine its distance from the ship, and secondly, to determine how far off the ship will be when it passes the light, provided said ship keeps a straight course.

A bearing of the light is taken and the angle between the light and the axis of the ship determined and noted upon the chart 10, as indicated by the line AOC, where OA represents the "fore and aft" line 19. The ship is then allowed to travel for a given time interval during which may be determined the speed of the ship, and hence the distance travelled in said time interval. At the conclusion of the latter a second bearing of the distant light is taken and noted upon the plotting table as indicated by AOB, and the index frame 41 is then set so that the distance between the indexes 40 and 36 represents the distance travelled as indicated on the scale 34.

The index carriage 29, together with the index frame 41, is then moved so that the indexes 40 and 36 lie on the lines OB and OC, respectively. In this case the distance of the ship from the distant light when the second bearing was taken is indicated by the length of the line OB, which may readily be determined by means of the circles and arcs 24. Although, of course, the ship has really travelled to a point E, and its distance from the distant light is really indicated by CE, it will be seen that as OECB is a parallelogram, the required distance is given by OB.

Further, should the ship keep a straight course, the distance at which it passes the distant light is indicated by $d'$, which may be read off directly upon the scale 48. Should this distance be too small or too great, the required angle of deviation in the steering of the ship may be readily obtained by setting the traverse bar 26 so that the distance of the indexes 36, 40 is equal to the required distance indicated by $d^2$ in Figure 7, and the index carriage 29 is moved so that the index 40 is at a point D where its distance is equal to the distance of the point B from said point O. The angle of deviation is then given by the angle BOD, and as $d^2$ is greater than $d'$ this deviation should be made to the starboard side of the "fore and aft" line 19, as indicated by OF. In the actual operation of the instrument the deviation from B to D is determined by the index 36, in order that index 40 may be ready for the next bearing.

In order that the traverse bar 26 may travel freely from side to side of the plotting table 10, a flat rail 49 is let into the front and rear edges of the plotting table 10 for the purpose of supporting the traverse carriages, 27, 28 on rollers 50, 51, respectively. The traverse bar 26 is moved by means of a hand-wheel 52 (see Figure 5) secured to a shaft bearing a pinion 53, which latter meshes with a further pinion 54 secured to a shaft 55 extending to the other end of the traverse bar 26, where it is secured to a pinion 56. The pinions 54, 56, mesh with racks 57, 58, respectively, each extending above the plotting table and supported by means of a bridge 59 and 60, respectively, said bridges being secured to the sides of the case 15. Thus, as the hand-wheel 52 is rotated, the pinions 54, 56 mesh with the fixed racks 57, 58, respectively, and propel the traverse bar along the tracks 49.

The locking mechanism for the traverse bar comprises a serrated or milled wheel 61 (see Figure 6) secured to the shaft 55 and adapted to co-operate with a roughened portion of a pivoted lever 62 secured to the traverse carriage 27, said lever 62 being operated by means of a screw 63 working in a trunnion arrangement 64 and actuated by means of a knob 65. Thus, when the knob 65 is rotated, the lever 62 is forced downwardly about its pivotal mounting 66 and prevents rotation of the serrated or milled wheel 61.

In order to take the end thrust of the traverse bar, rollers 67 are adapted to bear upon the sides of the bridges 59, 60.

The index carriage 29 (see Figures 1, 3 and 4) comprises a member 68 of channel-shaped cross-section and adapted to straddle the traverse bar 26, rollers 69 being provided to take the downward thrust and rollers 70 to take the lateral thrust, the plate 30, with the various scales and indexes being secured to its underside.

The mechanism for moving the index carriage 29 is illustrated in Figures 3 and 4, and comprises a gear-wheel 71 provided with a handle 72, and adapted to mesh with a pinion 73 driving a worm 74. This in turn meshes with a worm-wheel 75 driving a gear-wheel 76 which latter engages a long pinion 77 adapted to co-operate with a rack 78 secured to the under-part of the traverse bar 26 by means of blocks 79 which also form bearings for the shaft 55. By this means the index carriage 29 may readily be moved along the traverse bar 26 but is locked against accidental movement by means of the worm 74 and worm-wheel 75. In order to stabilize the index carriage 29 against accidental lifting, a roller 80 is pivotally mounted at its rear end.

The index frame 41 is moved longitudinally of the index carriage 29 by hand and runs upon rollers 81, a knob 82 and clamping member 83 being provided for securing the index frame 41 against accidental movement.

In the form of the outer case 15 illustrated in the drawings, a hinged lid 84 is adapted to enclose the instrument when out of use, while the upper portion 85 of the front of the case 15 is removable in order to give ready access to the hand-wheel 52. The sides of the lid are suitably shaped in order to provide sufficient support for the bridges 59, 60.

Although one form of the invention has been described, it will be understood that many modifications may be made in the details of construction, while a device according to the invention may readily be used for a number of determinations in addition to those given above; thus, for example, the device may readily be used for determining the effects of tidal currents, winds and other factors.

Further, in special circumstances the plotting table may take the form of a spherical or other form of surface, and for aerial or other inclined observations may be suitably inclined or disposed in a vertical plane.

For use when working at a short range, an additional scale or scales may be provided at each side of the traverse bar 26, as shown in Fig. 8, in which the additional scales 85 and 86 are inscribed with miles and fractions to double the linear scale of the chart 18. In this case, when using the scales 85 and 86, distances taken from or transferred to the chart 18 must be modified accordingly.

What I claim is:—

1. A navigational apparatus comprising a plotting table having thereon a "fore and aft" line and a plurality of lines radiating from a fixed point on said "fore and aft" line and a plurality of concentric circles and intersecting parallel lines indicating distances, a plurality of indexes movable longitudinally and transversely of the table, and means for maintaining said indexes always in parallelism with the "fore and aft" line.

2. A navigational apparatus comprising a table having thereon a longitudinal "fore and aft" line, a plurality of lines radiating from a fixed point on the "fore and aft" line and a plurality of concentric circles and parallel lines intersecting the radial lines, some of the parallel lines being parallel with the "fore and aft" line and some of the parallel lines being at right angles to the "fore and aft" line, a traverse bar parallel with the "fore and aft" line, means for effecting movement of said bar transversely of the table, a carriage mounted on said bar and movable along the same, a plurality of indexes on said carriage for cooperation with the lines on the table, and a scale upon the carriage indicating the distance between indexes.

3. A navigational apparatus comprising a table having a diagram thereon including a "fore and aft" line and distance and direction lines in fixed relation to the "fore and aft" line, a bar disposed above the table parallel with the "fore and aft" line, guides for said bar at the ends of the table, indexes carried by said bar and shiftable from end to end thereof, a shaft mounted in and extending longitudinally of said bar, racks on the guides, pinions on said shaft meshing with the racks, and means for rotating the shaft whereby to effect travel of the bar transversely of the table.

4. A navigational apparatus comprising a table having a diagram thereon including a "fore and aft" line and distance and direction lines in fixed relation to the "fore and aft" line, a bar disposed above the table parallel with the "fore and aft" line, guides for said bar at the ends of the table, indexes carried by said bar and shiftable from end to end thereof, a shaft mounted in and extending longitudinally of the bar, racks on the guides, pinions on the shaft meshing with the racks, means for rotating the shaft, a brake lever mounted on the bar above the shaft, and a threaded rod engaged in the free end of the lever whereby to effect locking engagement between the shaft and the lever to hold the bar against movement.

5. A navigational apparatus comprising a table having a diagram thereon including a "fore and aft" line and distance and direction lines in fixed relation to the "fore and aft" line, a bar disposed above the table for traveling transversely thereof, means whereby the bar is maintained in parallelism with the "fore and aft" line, a carriage mounted on said bar and movable along the same, a plate fixed on the carriage, scales and indexes on the plate to cooperate with the diagram on the table, and a scale mounted on the carriage above the plate and movable relative thereto to indicate a distance between the indexes on the plate.

In testimony whereof I have hereunto signed my name.

CLAUDE de VINCHELEZ LE SUEUR.